US010540729B1

(12) United States Patent
Maeng

(10) Patent No.: US 10,540,729 B1
(45) Date of Patent: Jan. 21, 2020

(54) MOBILE WALLETS WITH PACKAGED TRAVEL SERVICES

(71) Applicant: Wells Fargo Bank, N.A., San Francisco, CA (US)

(72) Inventor: Joon Maeng, Newcastle, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 796 days.

(21) Appl. No.: 14/989,289

(22) Filed: Jan. 6, 2016

Related U.S. Application Data

(60) Provisional application No. 62/273,057, filed on Dec. 30, 2015.

(51) Int. Cl.
| | | |
|---|---|---|
| *G06Q 50/14* | (2012.01) | |
| *G06Q 20/36* | (2012.01) | |
| *G06Q 20/32* | (2012.01) | |
| *H04W 4/02* | (2018.01) | |
| *H04W 4/18* | (2009.01) | |

(52) U.S. Cl.
CPC ......... *G06Q 50/14* (2013.01); *G06Q 20/3224* (2013.01); *G06Q 20/363* (2013.01); *H04W 4/025* (2013.01); *H04W 4/18* (2013.01)

(58) Field of Classification Search
CPC .................................................... G06Q 20/40
USPC ................................................................ 705/41
See application file for complete search history.

(56) References Cited

U.S. PATENT DOCUMENTS

| | | |
|---|---|---|
| 5,375,251 A | 12/1994 | Pfundstein |
| 6,944,447 B2 | 9/2005 | Portman et al. |
| 8,831,637 B2 | 9/2014 | Stopel et al. |
| 2002/0077993 A1 | 6/2002 | Immonen et al. |
| 2005/0076369 A1 | 4/2005 | Cai et al. |
| 2007/0265984 A1 | 11/2007 | Santhana |
| 2008/0051059 A1 | 2/2008 | Fisher |
| 2010/0125510 A1 | 5/2010 | Smith et al. |
| 2012/0089425 A1 | 4/2012 | Borucki |

(Continued)

FOREIGN PATENT DOCUMENTS

| | | |
|---|---|---|
| WO | WO-2014084484 A1 | 6/2014 |
| WO | WO-2014122453 A2 | 8/2014 |

OTHER PUBLICATIONS

Matt Buchanan, Apple can remotely disable apps installed on you iPhone, Aug. 6, 2008, GIZMODO (Year: 2008).*

(Continued)

*Primary Examiner* — Cho Kwong
(74) *Attorney, Agent, or Firm* — Schwegman Lundberg & Woesnner, P.A.

(57) ABSTRACT

Methods and systems for location-based mobile wallets are disclosed. A one-time mobile wallet can be established on a mobile device and associated with a travel itinerary. Device data and external data can be used with the travel itinerary to determine a travel assistance action. The location of the mobile device can be determined using GPS and/or contactless terminal data, for example. Based on the location of the mobile device and the travel itinerary, a travel assistance action can be performed. This can, for example, include presenting wallet elements to a user or automatically initiating a phone call to a service provider listed in the travel itinerary. In this way, travel assistance can vary with the location of the mobile device. After expiration of the duration, the one-time mobile wallet can be disabled.

21 Claims, 5 Drawing Sheets

(56) References Cited

U.S. PATENT DOCUMENTS

2013/0332337 A1   12/2013  Tran
2014/0089120 A1    3/2014  Desai et al.
2014/0129438 A1    5/2014  Desai et al.
2014/0279403 A1    9/2014  Baird et al.
2015/0045068 A1    2/2015  Soffer et al.

OTHER PUBLICATIONS

"Contactless Mobile Payment Application Activation User Interface Overview, Usage Guidelines, and PPSE Requirements,", EMVCo, Version 1.0, (Dec. 2010), 120 pgs.
"Wallet-POS Specification", GSM Association, Version 1.0, (May 2013), 32 pgs.
Pourghomi, Pardis, et al., "A Secure Cloud-Based Nfc Mobile Payment Protocol", vol. 5, (Nov. 2014), 8 pgs.

\* cited by examiner

| WALLET CARDS 202 | SECONDARY CARDS 204 | DESCRIPTION 206 | STATUS 208 | USE RESTRICTION 210 |
|---|---|---|---|---|
| AIRLINES CARD | AIRLINE TICKETS | AA TICKET NUMBER: 12345678 | PREPAID | 3:00-9:00 PM, 8/10/2015<br><br>4:30-8:30 PM, 8/17/2015 |
| | PAYMENT CARD | VISA FOR AMENITIES, LUGGAGE FEES | PREAPPROVED | 8/10/2015-8/17/2015 |
| HOTEL CARD | ROOM KEY | ROOM KEY | RESERVED TO-BE-ACTIVATED | 8/10/2015-8/17/2015 |
| | HOTEL AMENITY CARD | MASTERCARD FOR HOTEL AMENITIES, FEES | TO-BE-ACTIVATED | 8/10/2015-8/17/2015 |
| MUSEUM PASS | MUSEUM TICKET | TICKETS FOR THE LOUVRE | PREPAID | THE LOUVRE; 8/11/2015 |
| | MUSEUM AMENITY CARD | VISA FOR MUSEUM GIFT SHOP, RESTAURANT | PREAPPROVED | 8/10/2015-8/17/2015 |
| TRANSPORTATION CARD | SEATTLE TAXI CARD | HOME TO AIRPORT | PREPAID | 1:00 PM 8/17/2015 |
| | PARIS TAXI CARD | AIRPORT TO HOTEL | RESERVED | 10:00 PM 8/17/2015 |
| | PARIS SUBWAY CARD | 7DAY PASS | PREPAID | 8/11/2015-8/17/2015 |
| EMERGENCY CONTACTS | VISA AND MASTERCARD | CREDIT CARDS FOR GENERAT USE | PREAPPROVED | 8/10/2015-8/17/2015 |
| EMERGENCY CONTACTS | US EMBASSY CONTACT CARD | +33 1 43 12 22 22 ADDRESS: 2 AVENUE GABRIEL, 75008 PARIS FRANCE | | |
| | PARIS POLICE CARD | EMERGENCY NUMBER FOR ENGLISH SPEAKING POLICE ASSISTANCE | | |

MOBILE WALLETS WITH PACKAGED TRAVEL SERVICES

TECHNICAL FIELD

Embodiments described herein generally relate to mobile wallets and, for example and without limitation; mobile wallets with packaged travel services.

BACKGROUND

Mobile wallets can allow consumers to make contactless payments for products and services with mobile devices such as phones or watches instead of cash, credit cards or checks. Using an antenna in the mobile device, mobile wallets can communicate with contactless readers using near field communication (NFC). They can allow consumers to make secure payments in a relatively quick manner by placing their mobile devices near contactless readers at stores. Mobile wallets can also be used to make purchases within applications on mobile devices and over the internet.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings, in which;

FIG. 2 illustrates a mobile travel wallet, according to various examples; and

DETAILED DESCRIPTION

The present disclosure describes systems and methods for using mobile wallets for travel. In various examples, a one-time mobile wallet can be established on a mobile device and along with a travel itinerary. The mobile wallet and travel itinerary can be issued by a wallet service provider or another entity such as a travel agency, as examples. During travel, the location of the mobile device can be determined using GPS and/or contactless terminal data and, based on the location and the travel itinerary, a travel assistance action can be performed. This can include presenting wallet elements to a user for selection or automatically presenting a credit card element for a payment or initiating a phone call to a service provider listed in the travel itinerary as examples. In this way, travel assistance can vary with the location of the mobile device and the traveler's itinerary. After expiration of the duration, the one-time mobile wallet can be disabled.

Figure 1:
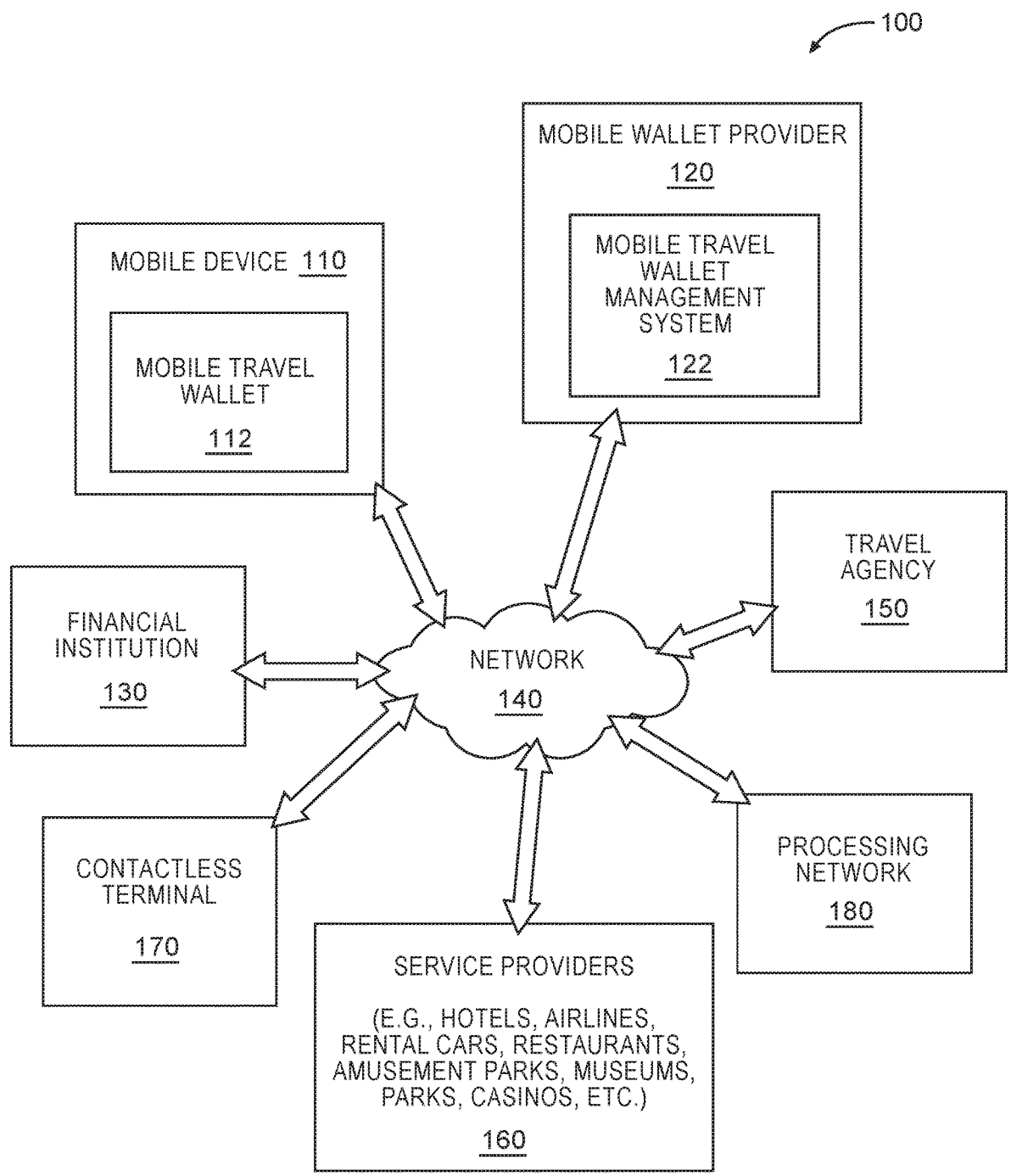
FIG. 1. illustrates a schematic diagram of a mobile wallet environment, according to various examples.

FIG. 1 illustrates an example environment 100 that includes a mobile travel wallet application 112 configured for travel services and a mobile wallet management system 122 that can determine the location and/or time of the mobile wallet and perform travel assistance actions depending on the travel itinerary associated with the mobile travel wallet 112. An example travel itinerary is shown in FIG. 2. The mobile travel wallet application 112 (sometimes, simply referred to as a mobile travel wallet) can operate on a mobile device 110 such as a smart phone or smart watch and can be separate from or part of a user's main mobile wallet.

The mobile travel wallet can include one or more wallet elements such as, for example, payment cards (e.g., credit cards, debit cards, gift cards), identification cards (e.g., driver's licenses, student ID's, passports), bank accounts (e.g., checking accounts, saving accounts), insurance cards (e.g., health insurance cards, auto insurance cards), promotional cards (e.g., coupons, discount cards) and other items (e.g., tickets, boarding passes, membership cards, contact cards). For each wallet element, the mobile device 110 can store unique information. For a credit card, for example, the unique account information can be a unique token and cryptograph typically provided by the card network and/or card-issuing bank. In another example, the unique account information for a credit card can be the credit card number and the account holder's name. The mobile travel wallet 112 can be issued by different entities depending on the application, as discussed below. The example environment further includes a mobile wallet provider 120 and a financial institution 130 (such as a bank or credit card company, for example). The mobile wallet provider 120 can, for example, interface with the mobile wallet 112 and a travel agency 150 for providing packaged travel services. The mobile wallet provider 120 can be a card issuer or bank or can be a service provider, separate from those systems, for example. Example mobile wallet providers include Apple, Google, Samsung, Starbucks and Visa.

The mobile wallet provider 120 can, for example, include the mobile travel wallet management system 122. The travel wallet management system 122 can manage mobile travel wallets such as wallet 112 and mobile wallet transactions and interactions with other organizations. The mobile wallet management system 122 can also determine the location of the mobile wallet and perform travel assistance actions depending on the location and a travel itinerary associated with the mobile travel wallet 112. The mobile wallet management system 122 can, for example, include computer servers and storage as part of a cloud computing system.

The mobile device 110 can include multiple wireless communication interfaces to enable wireless communication using NEC (Near Field Communication), Bluetooth, and Wi-Fi, for example. The mobile device 110 can also include a location sensor such as GPS device and a GPS application. The mobile wallet 112 can be used for transactions in a variety of ways including, as examples, at point-of-sale (POS) card readers such as contactless terminal 170, through applications operating on the mobile device 110, and over the internet though websites.

To make a payment at merchant's store, for example, a user can select a wallet element (e.g., credit card) for the transaction and place the mobile device near the contactless terminal 170. The mobile device 110 can then wirelessly, transfer unique account information (e.g., token and cryptograph) for the credit card to the contactless terminal 170 using near field communication (NFC) or magnetic secure transmission (MST), for example. The mobile device 110 can also generate and send to the contactless terminal 170 a dynamic security code that is transaction specific. The contactless terminal 170 can send a merchant identification number, the unique account information (e.g., token and cryptograph) and transaction-specific dynamic security code, and the transaction amount to a processing network 180 (e.g., card network and issuing banks) to authorize payment. The user can also be requested by the mobile device 110 to authenticate the payment request by providing a fingerprint or entering a pin number or code.

The illustrated environment further includes service providers 160 that can, for example, provide a variety of services to mobile wallet users. Example service providers 160 include hotels, rental cards, airlines, museums, amusement parks, restaurants, casinos, and others. While not necessary, one or more of the service providers 160 can be specified in a mobile travel wallet for a packaged travel itinerary.

The environment can further include one or more networks such as the network 140 over which the various systems communicate using network interfaces. The network 140 can include local-area networks (LAN), wide-area networks (WAN), wireless networks (e.g., 802.11 or cellular network), the Public Switched Telephone Network (PSTN) network, ad hoc networks, cellular, personal area networks or peer-to-peer (e.g., Bluetooth®, Wi-Fi Direct), or other combinations or permutations of network protocols and network types. The network 140 can include a single local area network (LAN) or wide-area network (WAN), or combinations of LAN's or WAN's, such as the Internet.

While the mobile travel wallet 112 is illustrated as residing on the mobile device 110 and the mobile wallet management system 122 is illustrated as residing on the mobile wallet provider system 120, the examples herein are not limited to this configuration. The functionality of the mobile travel wallet and the mobile wallet management system can reside entirely on the mobile device or the wallet service provider (or another external system) or can be distributed or shared between the mobile device and the wallet provider/external system. In yet another example, the mobile travel wallet 112 can be a client application accessing a remotely stored mobile travel wallet e.g., stored on a server associated with the mobile wallet service provider 120).

FIG. 2 illustrates an example travel itinerary 200 for a mobile travel wallet. As noted above, a mobile wallet management system can determine the location and/or time of a mobile wallet and perform travel assistance actions depending on the travel itinerary associated with the mobile travel wallet. The travel itinerary 200 can for example be a database stored, e.g., on a mobile device or a server associated with a mobile service provider.

The illustrated travel itinerary 200 has a time period of Aug. 10, 2015 to Aug. 17, 2015. The example travel itinerary 200 identifies a set of wallet cards or elements 202 and secondary cards or elements 204. The wallet cards 202 can, for example, be organized by general or broader categories and include card elements for an airline, a hotel, museums, transportation, credit cards and emergence contacts. The secondary cards can include specific cards within each general wallet card 202. For example, when a user selects the credit card wallet element, two credit cards—a Visa card and a MasterCard—can be displayed for selection by the user for a transaction. The travel itinerary 200 associates one or more of the wallet elements 202 or secondary cards 204 with a use restriction 210. The use restriction 210 can, for example, set a duration during which the card can be used or a location at which the card can be used, or both. In some examples, the travel itinerary 200 can include a description 206 and status of one or more secondary, wallet cards 204. In some examples, the travel itinerary 200 can include one or more wallet cards without secondary cards.

The travel itinerary 200 and its associated mobile travel wallet can be issued by different entities depending on the application. For example, a travel agency can determine the wallet elements and the travel itinerary for a mobile travel wallet and send this information to a mobile wallet provider which in turn can issue a mobile travel wallet along with the travel itinerary for a user. In another example, an employer can determine the wallet elements and the travel itinerary using an application provided by a wallet service provider. In another example, a travel agency 150 can send a travel itinerary to a mobile wallet provider which can determine the wallet elements for and issue the mobile travel wallet and itinerary for the user. The mobile travel wallet associated with the travel itinerary 200 can, for example, be a one-time mobile wallet usable for a duration of the itinerary and disabled afterwards (e.g., suspended or erased).

Figure 3:
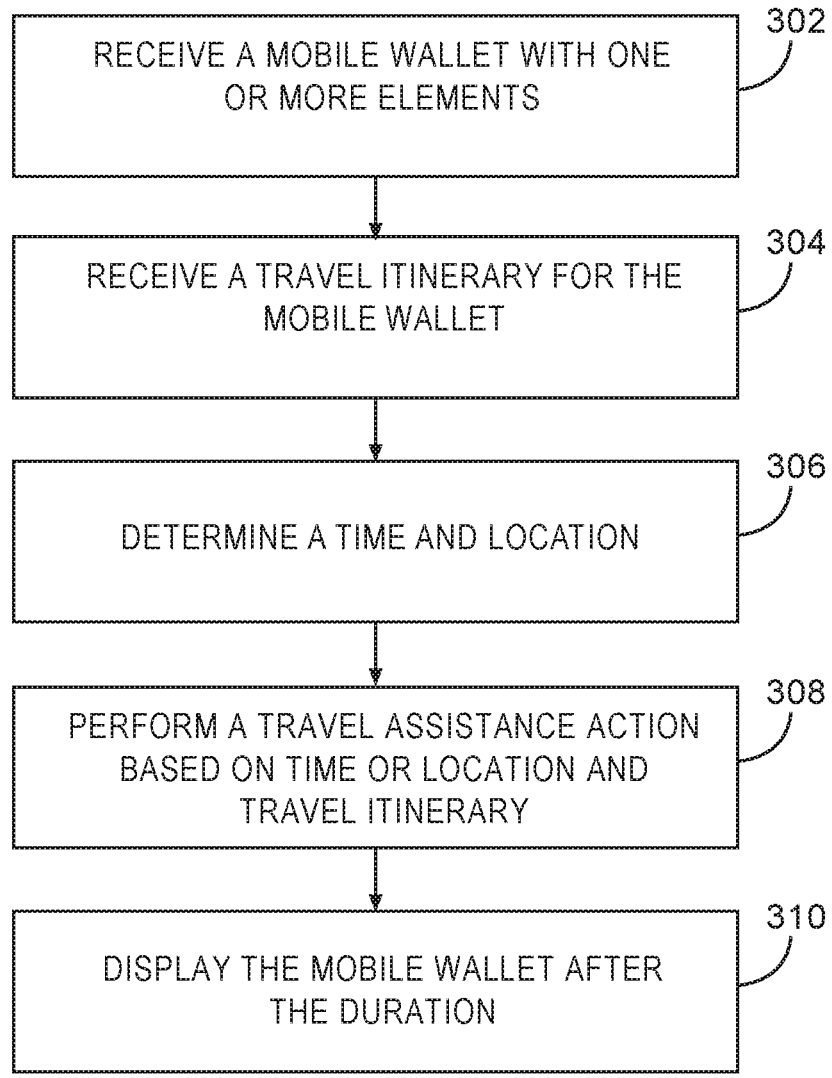
FIG. 3 illustrates a flowchart of a method of using a mobile travel wallet, according to various examples.

FIG. 3 illustrates an example method 300 of using a mobile travel wallet according to an example. At block 302, a mobile wallet including one or more wallet elements is received. The mobile wallet can for example be issued by a wallet service provider and received by a mobile device or a server associated with the wallet service provider or both. The mobile wallet can be an application residing on the mobile device with the elements stored on the mobile device or an application operating on an external system, with the wallet elements stored remotely from the mobile device and the mobile device being an interface to the mobile travel wallet. At block 304, a travel itinerary for the mobile wallet is received. The travel itinerary can have a time duration and can associate each wallet element with a time period. The travel itinerary can be stored in a database on the mobile device or at the mobile wallet provider for example. The travel itinerary can also store location or other use restrictions for a mobile wallet element.

At block 306, a mobile wallet management system can determining a time and a location of the mobile device. The mobile wallet management system can be an application operating on a system separate from the mobile device (e.g., on a wallet service provider system) or an application operating on the mobile device (e.g., a stand-alone application or a sub-module within the mobile travel wallet application) or can have functionality distributed between the mobile device and an external system. Determining time and location can, for example, include receiving location and time data from one or multiple sources such as GPS data from a GPS system associated with the mobile device and terminal data associated with one or more contactless terminals having communicated with the mobile device.

For example, the mobile wallet management system can periodically poll GPS time and location data stored on the mobile device (or poll GPS location data and time-stamp it). The mobile wallet management system can, during transactions, query contactless terminals and receive time and location data from the terminals (or receive terminal location data and time-stamp it). In other cases, the mobile wallet management system can receive a terminal's unique identifier and query an external geo-database to obtain the location data of the terminal. The location data and time data from the various sources can be stored in a database to determine wallet elements as discussed herein.

In one example, the mobile wallet management system can determine the location and time based on the most recent data from the same source (e.g., based on time-stamps), either based on GPS data from a GPS system or terminal data from a contactless terminal. In another example, the mobile wallet management system can determine time from the most recent GPS time data and determine location from the most terminal data provided the terminal data has a time-stamp within a short period of time before the GPS time data. This can be helpful in environments where GPS location data is less reliable.

At 308, the mobile wallet management system can perform a travel assistance action based on the time and the location of the mobile device and the travel itinerary. This can be done by, for example, querying the travel itinerary to identify wallet elements corresponding to the determined time and/or location. The travel assistance action can range from suggesting next steps for a traveler based on the travel itinerary, presenting wallet elements for a user select based on the user's location, or automatically taking action such as presenting a wallet element or making a phone call based on the travel itinerary, as examples. The travel assistance action can, for example, include presenting on a display of the mobile device a suggested action for a user based on the travel itinerary, time and location, including suggestions to call a particular transportation service or hotel.

At 310, the mobile wallet management system disables the mobile wallet after expiration of the duration. The mobile wallet management system can, for example, suspend the mobile travel wallet or remove the mobile travel wallet from the mobile device and other storage locations. Suspension of the mobile wallet can provide an easier means to re-establish the mobile travel wallet for another travel itinerary. Suspension can, for example, be done by entering a suspension flag in a database for the mobile wallet.

The travel assistance action (block 308) can include selecting at least one of the wallet elements based on the location and/or the time, and the travel itinerary. The travel assistance action can further include displaying (e.g., on a user interface of the mobile device) the selected wallet elements on the mobile device and receiving a user's selection of one or more wallet elements to use for a transaction. The assistance action can further include establishing communication between the mobile device and a service provider associated with the user-selected element. In some examples, the assistance action can include automatically using the selected at least one of the wallet elements for a payment or non-payment transaction without further user input. For example, the mobile wallet management system can select a transportation card for a particular taxi company (e.g., based on use restrictions and time and location data) and call the taxi company so the user can hail a car.

The travel assistance action can include selecting at least one of the wallet elements based on the location data source. For example, if the location data source is GPS, the management system can present transportation cards and if the location source is a contactless terminal, the management system can present credit cards, coupons for a merchant associated with the contactless terminal. In some examples, the management system can also present merchant information for other merchants within the vicinity of the location of the contactless terminal.

The method 300 can further include receiving a user selection of an element from the one or more displayed mobile wallet elements and sending transaction authorization data to a contactless terminal based on the user selection. For example, in a store, the management system can receive time and location data from a contactless terminal, use this information to select a credit card for payment, and send the transaction authorization data (e.g., device account number, token) associated with the credit card to a processing network. The management system, in some examples, can further provide travel assistance through the mobile travel wallet by, for example, presenting information concerning upcoming agenda items on a travel itinerary (e.g., based on time and location data associated with travel itinerary items).

Figure 4:
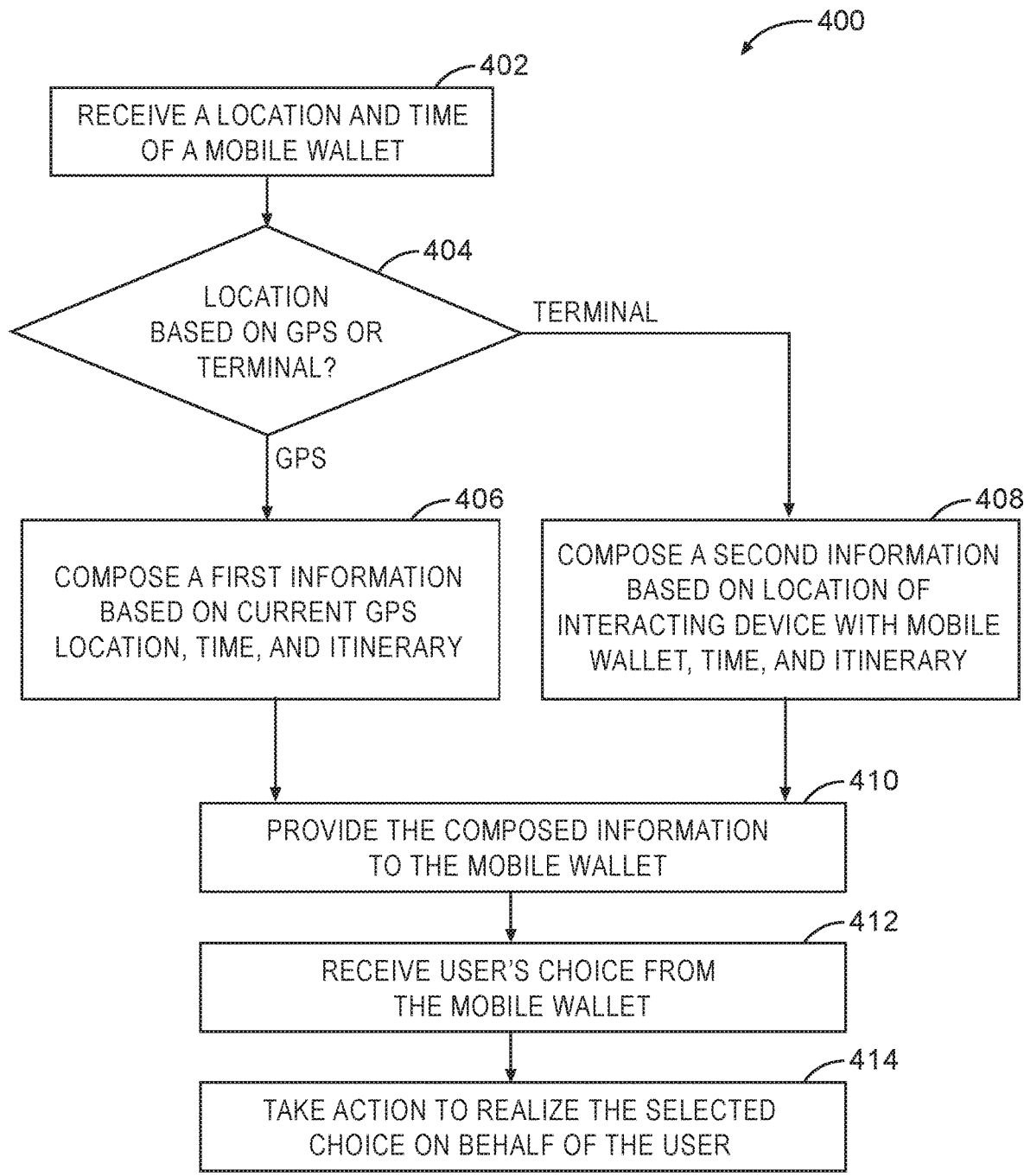
FIG. 4 illustrates a flowchart of a method of using a mobile travel wallet, according to various examples.

FIG. 4 illustrates an example method 400 of using a mobile travel wallet according to an example. The method 400 is described with reference to a mobile travel wallet operating on a mobile device such as a phone. At block 402, a mobile wallet management system can receive location and time data of the mobile travel wallet. The location and time data can be based on time-stamped data from a GPS system associated with the mobile device or terminal data from contactless terminals (e.g., POS device) interacting with the mobile travel wallet, as examples. At 404, the management system can determine the location of the mobile travel wallet. As discussed above, the location can be determined based on the most recent time-stamped location data whether from a GPS source or for a contactless terminal, or the location can be determined from contactless terminal location data even when it is not the most recent GPS location data if it is within a short period of time of the most recent data. If using GPS data from the location, the management system can identify a first information set based on current GPS location, time, and the traveler's itinerary (e.g., the use restrictions including time and locations as illustrated in FIG. 2) at block 406. If the location information is from a contactless terminal, the management system can identify a second set of information based on the location of the terminal interacting with the mobile wallet, the time (e.g., from GPS time-stamps or terminal time-stamps) and the itinerary at block 408. The first set of information can include transportation choices such as mobile wallet elements for transportation companies or general transportation information. The second set of information can include shopping assistance information such as products information for goods sold by a merchant associated with the contactless terminal, information about the merchant, wallet elements such as credit cards and discount coupons. The second set of information can, for example, also include suggestions to visit other stores in the same shopping mall or vicinity of the contactless terminal (e.g., querying a database of geocoded merchants).

The management system can present the composed information (based on the source of the location data) to the traveler (e.g., the mobile wallet user) via the mobile wallet at block 410. The mobile wallet can display the composed information with choices, such as wallet elements, for the traveler to select. The management system can receive the mobile wallet user's selection at block 412 and take an action to realize the selected choice on behalf of the user at 414. For instance, if the mobile wallet user selected a taxi to go to the next destination from the composed information, the management system can make contact with the taxi company (e.g., via an Application Programming Interface call), request a car and inform the company of the location of the traveler (e.g., based on the GPS data from the mobile device with the mobile travel wallet) and/or establish a call with the mobile wallet user's mobile device and a dispatcher.

In another example, the management system can determine the next activity in an itinerary and inform the user via the mobile wallet of possible actions. For example, the management system can display to the user a message to queue for a certain time to obtain a ticket for an event. The management system, mobile wallet or wallet element can, for example, further track expenses and report the expenses (e.g., to an employer associated with the mobile travel wallet) when the time period for the mobile wallet has ended.

The above examples illustrate the performance of a travel assistance action based on device data (e.g., GPS data from a mobile device) and data from a source external to the device ("external data") (e.g., location data from a contactless reader) and the travel itinerary. Device data and external data are not limited to location data. Other device data and external data can be used by a management system to determine a travel assistance action. For example, a mobile wallet management system can maintain or retrieve (e.g., from card issuer or financial institution) an account balance for one or more of the wallet elements and can select one or more wallet elements as the travel assistance action based on the account balance(s). For example, a travel itinerary can indicate multiple available payment elements and the payment element with the lowest account balance or most available credit can be presented for a transaction.

Figure 5:
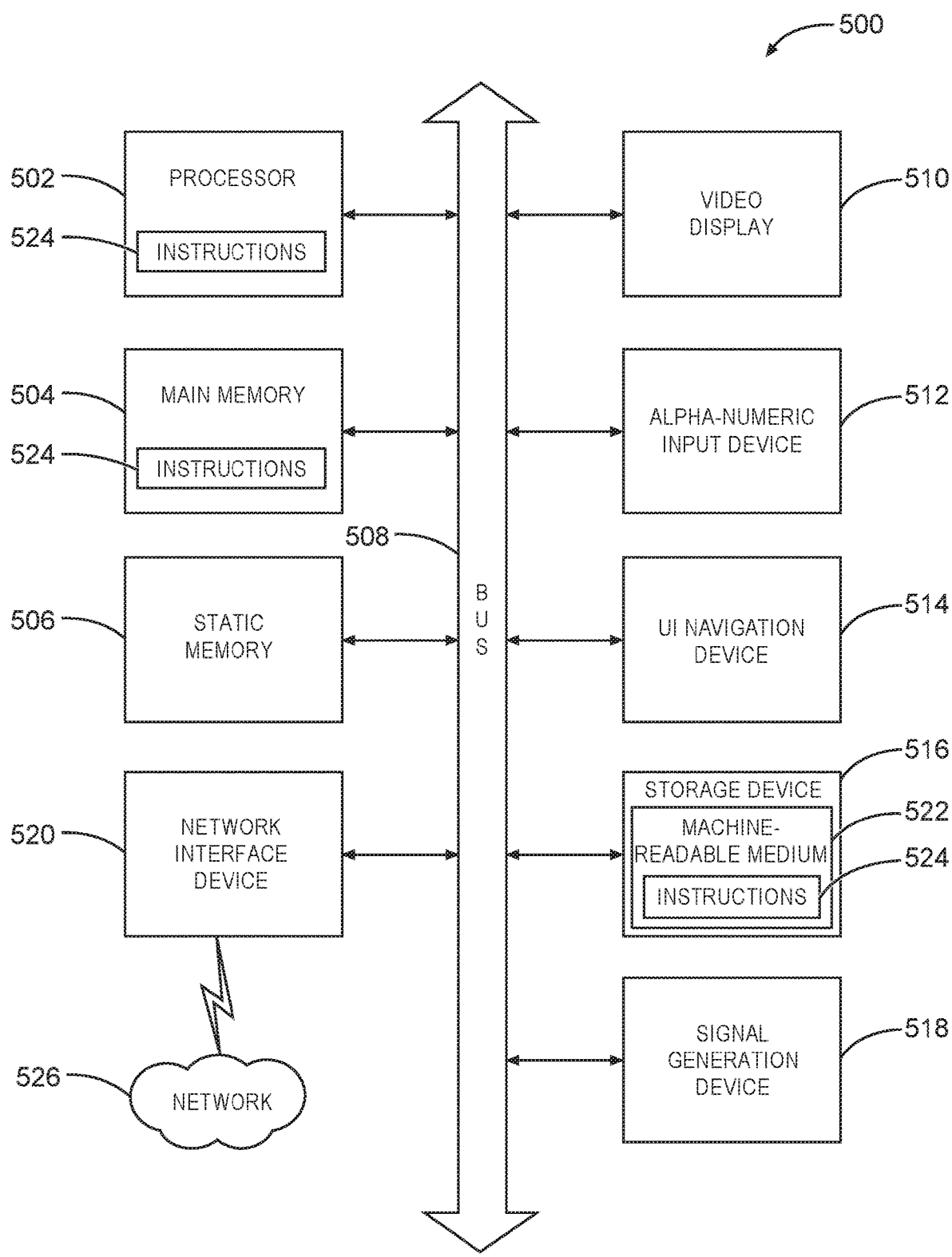
FIG. 5 is a block diagram of a machine in the example form of a computer system within which a set of instructions, for causing the machine to perform any one or more of the methodologies discussed herein, may be executed.

FIG. 5 is a block diagram illustrating a machine in the example form of a computer system 500, within which a set or sequence of instructions can be executed to cause the machine to perform any one of the methodologies discussed herein, according to an example embodiment. In alternative embodiments, the machine operates as a standalone device or can be connected (e.g., networked) to other machines. In a networked deployment, the machine can operate in the capacity of either a server or a client machine in server-client network environments, or it can act as a peer machine in peer-to-peer (or distributed) network environments. The machine can be a personal computer (PC), a tablet PC, a hybrid tablet, a set-top box (STB), a personal digital assistant (PDA), a mobile telephone, a web appliance, a network router, switch or bridge, or any machine capable of executing instructions (sequential or otherwise) that specify actions to be taken by that machine. Further, while only, a single machine is illustrated, the term "machine" shall also be taken to include any collection of machines that individually or jointly execute a set (or multiple sets) of instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 can further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 can additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 can also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" can include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include; but not be limited to; solid-state memories, and optical and magnetic media. Specific examples of machine-readable media include non-volatile memory, including, but not limited to, by way of example, semiconductor memory devices (e.g., electrically programmable read-only memory (EPROM); electrically erasable programmable read-only memory (EEPROM)) and flash memory devices; magnetic disks such as internal hard disks and removable disks; magneto-optical disks; and CD-ROM and MID-ROM disks.

The instructions 524 can further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet; mobile telephone networks, plain old telephone (POTS) networks, and wireless data networks (e.g., Wi-Fi, 3G, and 4G LTE/LTE-A or Imax networks). The term "transmission medium" shall be taken to include any intangible medium that is capable of storing, encoding, or carrying instructions for execution by the machine, and includes digital or analog communications signals or other intangible medium to facilitate communication of such software.

The above description is intended to be illustrative, and not restrictive. For example, the above-described examples (or one or more aspects thereof) can be used in combination with others. Other embodiments can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein as embodiments can feature a subset of said features. Further, embodiments can include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A method of using a mobile device associated with a mobile wallet for travel, the method comprising:
receiving, by the mobile device, the mobile wallet including one or more wallet elements;
receiving a travel itinerary having a time duration, the travel itinerary associating each wallet element with a time period;
determining a time and a location of the mobile device;

performing a travel assistance action based on the time and the location of the mobile device and the travel itinerary; and disabling the mobile wallet received by the mobile device after expiration of the time duration, wherein the mobile wallet is disabled through receipt of a wallet suspension command from a mobile wallet management system, and wherein disabling the mobile wallet prevents access to the mobile wallet by the mobile device.

2. The method of claim 1, wherein determining the time and the location of the mobile device includes:

receiving location data and time data for the mobile device from multiple sources including GPS data from a GPS system associated with the mobile device and terminal data from one or more contactless terminals having communicated with the mobile device; and determining the time and the location from the location data and time data.

3. The method of claim 2, wherein determining the time and location includes determining the time and location based on data from a common source.

4. The method of claim 3, wherein determining the time and the location includes determining the time based on GPS data and determining the location based on terminal data.

5. The method of claim 3, wherein the location is determined by the terminal data when the terminal data is more recent that the GPS data or older than the GPS data by less than a threshold period.

6. The method of claim 2, wherein performing the travel assistance action includes:

selecting one or more wallet elements associated with travel service providers when the location is determined from GPS data; or selecting one or more wallet elements associated with products, stores or coupons associated with the vicinity of the location when the location data is determined from terminal data.

7. The method of claim 1, wherein performing the travel assistance action includes presenting on a display of the mobile device a suggested action for a user.

8. The method of claim 1, wherein performing the travel assistance action includes selecting at least one of the wallet elements based on the location, the time, and the travel itinerary.

9. The method of claim 8, further including displaying the selected one or more of the multiple wallet elements on the mobile device; and receiving a user selection of an element from the one or more displayed mobile wallet elements.

10. The method of claim 9, further including establishing communication between the mobile device and a service provider associated with the user-selected element.

11. The method of claim 8, further including automatically using the selected at least one of the wallet elements for a payment or non-payment transaction without further user input.

12. A non-transitory computer-readable storage medium, the computer-readable storage medium including instructions that when executed by a computer, cause the computer to perform operations of:

receiving one or more wallet elements for the mobile wallet;

receiving a travel itinerary having a time duration, the travel itinerary associating each wallet element with a time period;

determining a time and a location of the mobile device;

performing a travel assistance action based on the time and the location of the mobile and the travel itinerary; and disabling the mobile wallet after expiration of the time duration, wherein the mobile wallet is disabled through receipt of a wallet suspension command from a mobile wallet management system, and wherein disabling the mobile wallet prevents access to the mobile wallet by the mobile device.

13. The computer-readable medium of claim 12, wherein:

determining the time and the location of the mobile device includes determining the time and location from GPS data or from terminal data from one or more contactless terminals having communicated with the mobile device; and performing the travel assistance action includes:

selecting one or more wallet elements associated with travel service providers when the location is determined from GPS data; or selecting one or more wallet elements associated with products, stores or coupons associated with the vicinity of the location when the location data is determined from terminal data.

14. The computer-readable medium of claim 12, wherein performing the travel assistance action includes presenting on a display of the mobile device a suggested action for a user.

15. The computer-readable medium of claim 12, wherein performing the travel assistance action includes selecting at least one of the wallet elements based on the location, the time, and the travel itinerary.

16. The computer-readable medium of claim 15, wherein performing the travel assistance action includes displaying the selected one or more of the multiple wallet elements on the mobile device; and receiving a user selection of an element from the one or more displayed mobile wallet elements.

17. The computer-readable medium of claim 12, wherein performing the travel assistance action includes automatically using the selected at least one of the wallet elements for a payment or non-payment transaction without further user input.

18. A system comprising:

at least one processor; and at least one storage device comprising instructions, which when executed by the at least one processor, configure to at least one processor to perform operations comprising:

receiving one or more wallet elements for a mobile wallet operating on a mobile device and;

receiving a travel itinerary having a time duration, the travel itinerary associating each wallet element with a time period;

receiving first data from the mobile device and second data from a source external to the mobile device;

performing a travel assistance action based on the travel itinerary and one or more of the first data and the second data; and disabling the mobile wallet after expiration of the time duration, wherein the mobile wallet is disabled through receipt of a wallet suspension command from a mobile wallet management system, and wherein disabling the mobile wallet prevents access to the mobile wallet by the mobile device.

19. The system of claim 18, wherein performing the travel assistance action includes presenting on a display of the mobile device a suggested action for a user.

20. The system of claim 18, wherein the one or more wallet elements include multiple payment elements and the first data or the second data includes an account balance for each of the multiple payment elements, and wherein performing the travel assistance action includes selecting at least one of the multiple payment elements based on the account balance of the selected payment element.

21. The system of claim 18, wherein performing the travel assistance action includes automatically using a selected at least one of the wallet elements for a payment or non-payment transaction without further user input.

* * * * *